United States Patent
Jones et al.

(10) Patent No.: US 7,580,607 B2
(45) Date of Patent: Aug. 25, 2009

(54) CENTER-LOCK AERIAL SLACK CABLE STORAGE BRACKET

(75) Inventors: John Jones, Independence, OH (US); George P. Dudash, Willowick, OH (US)

(73) Assignee: Preformed Line Products Company, Mayfield Village, OH (US)

(*) Notice: Subject to any disclaimer, the term of this patent is extended or adjusted under 35 U.S.C. 154(b) by 0 days.

(21) Appl. No.: 12/026,789

(22) Filed: Feb. 6, 2008

(65) Prior Publication Data

US 2008/0193096 A1 Aug. 14, 2008

Related U.S. Application Data

(60) Provisional application No. 60/889,588, filed on Feb. 13, 2007.

(51) Int. Cl.
*G02B 6/00* (2006.01)
(52) U.S. Cl. .................. 385/135; 385/134; 385/136; 385/137; 385/147
(58) Field of Classification Search .......... 385/135, 385/136
See application file for complete search history.

(56) References Cited

U.S. PATENT DOCUMENTS

| | | | | |
|---|---|---|---|---|
| 5,092,663 A | * | 3/1992 | Hivner | .......... 385/100 |
| 5,408,571 A | * | 4/1995 | Kaplan | .......... 385/135 |
| 5,867,624 A | * | 2/1999 | Forrester et al. | .......... 385/134 |
| 6,215,937 B1 | * | 4/2001 | Dinh | .......... 385/134 |
| 6,311,006 B1 | * | 10/2001 | Forrester et al. | .......... 385/134 |
| D450,042 S | | 11/2001 | Kaplan | |
| 6,898,363 B2 | * | 5/2005 | Forrester et al. | .......... 385/134 |
| 7,085,468 B2 | * | 8/2006 | Forrester | .......... 385/135 |
| 2002/0003939 A1 | * | 1/2002 | Hermsen et al. | .......... 385/135 |
| 2002/0034369 A1 | | 3/2002 | Forrester et al. | |
| 2004/0001686 A1 | | 1/2004 | Smith et al. | |
| 2005/0145522 A1 | | 7/2005 | Bloodworth et al. | |
| 2005/0238311 A1 | * | 10/2005 | Forrester | .......... 385/136 |
| 2006/0005983 A1 | | 1/2006 | Rizzuto, Jr. et al. | |
| 2006/0275010 A1 | * | 12/2006 | Forrester | .......... 385/136 |
| 2006/0278426 A1 | | 12/2006 | Barth et al. | |

OTHER PUBLICATIONS

International Search Report and Written Opinion dated Jul. 21, 2008 for PCT Application Serial No. PCT/US08/53299, 9 Pages.

* cited by examiner

*Primary Examiner*—Ryan Lepisto
(74) *Attorney, Agent, or Firm*—James J. Pingor; Driggs, Hogg, Daugherty & Del Zoppo Co., L.P.A.

(57) ABSTRACT

A center-lock aerial slack cable storage bracket (CLAS) is disclosed. More particularly, the CLAS improves time and efficiency of installation upon a cable under tension by employing a hinged center-lock mechanism. During installation the hinged center-lock mechanism enables the unit to be hinged-open, placed upon a cable under tension and hinged-closed. Once hinged-closed over the cable under tension, standard 'off-the-shelf' straps or tie-strips can be used to secure the unit into place, without a need for any specialized tools, hardware kits or brackets.

18 Claims, 9 Drawing Sheets

CENTER-LOCK AERIAL SLACK CABLE STORAGE BRACKET

CROSS-REFERENCE TO RELATED APPLICATIONS

This application claims the benefit of U.S. Provisional Patent application Ser. No. 60/889,588 entitled "CENTER-LOCK AERIAL SLACK CABLE STORAGE BRACKET" and filed Feb. 13, 2007. The entirety of the above-noted application is incorporated by reference herein.

BACKGROUND

Optical fibers refer to a glass or plastic fiber designed to guide light down its length by total internal reflection. These fibers are used in fiber-optic communication which permits digital data transmission over longer distances and at higher data rates than electronic communication. In outdoor aerial applications, the fibers are encased within a cable jacket along with strength members.

The total internal reflection phenomenon, which occurs when light travels down a fiber optic core of an optical optic fiber, requires that the light rays reflecting off the boundary of the fiber optic core not exceed a critical angle of reflection at the boundary. This critical angle of reflection is determined by a ratio of indices of refraction of the fiber optic core and the cladding which surrounds the core and is made from a substance with an index of refraction greater than that of the core. To avoid letting the reflection angle exceed the critical angle, both optical fibers and fiber optic cables should not curve at an angle sharper than a specified bend radius for the given fiber or cable.

A standard cable can contain up to a thousand individual fibers. For use in outdoor environments, a robust cable construction is used whereby the fiber is often laid helically into semi-rigid tubes (e.g., plastic), allowing the cable to stretch without stretching the fiber itself. These semi-rigid tubes protect the fiber from tension during installation as well as changes due to temperature. Alternatively, the fiber is sometimes embedded in a heavy polymer jacket. Oftentimes, the fibers are bundled with strength members to protect the fiber in instances of stretching.

When installing fiber optic cables into aerial installations, it is most often desired to store an excess length of the fiber optic cable for future use. For example, this excess length can be used if relocation requiring additional length is necessary. Additionally, this excess length is often a product of the length used when splicing the cable at ground-level. Accordingly, aerial slack cable storage brackets are frequently used to house this excess length of cable.

However, although it is useful to maintain the excess length of fiber optic cable in a manner that protects the integrity of the cable (e.g., minimum bend radius), installation of conventional aerial slack storage mechanisms is not always an easy task. For example, conventional aerial slack storage mechanisms are most often constructed of metal and/or plastic with multiple components to connect the slack storage bracket to cable system strength member. Additionally, conventional mechanisms employ hardware-based bracketed fastener systems which increase installation time and expense. Most often, the storage bracket is suspended from a support bracket, or alternatively, affixed to a transmission line or utility pole using specially designed support brackets.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a 'center-lock' aerial slack cable storage bracket (CLAS) that can enhance installation, shipment and storage of aerial slack storage bracket systems. More particularly, in one aspect, the CLAS described herein is a two-piece design that hinges upon the center-line of the bracket. It will be appreciated that this hinging design particularly facilitates ease of installation upon a cable under tension or other strength member. It is to be understood that the bracket described herein can be used in connection with most any conceivable cable under tension or strength member without departing from the spirit and scope of this disclosure and claims appended hereto. As such, these terms are intended to be used interchangeably herein where one includes the other and vice-versa.

Additionally, because the CLAS described herein is a two-piece design, it can be easily disassembled (e.g., folded or separated) which facilitates ease of shipment as well as storage of inventory. Still further, the design of the CLAS described herein can be installed upon the cable under tension without common or specialized tools, hardware or brackets (e.g., nuts, bolts, metal clamps). Rather, cable straps (or other tie means) can be used to secure the two halves or sections of the CLAS together upon a cable under tension. For instance, in one aspect, a strap with high ultra-violet (UV) protection can be used to secure the two halves together as well as to the cable under tension.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and features of the innovation will become apparent from the following detailed description of the innovation when considered in conjunction with the drawings.

DETAILED DESCRIPTION

Figure 1:
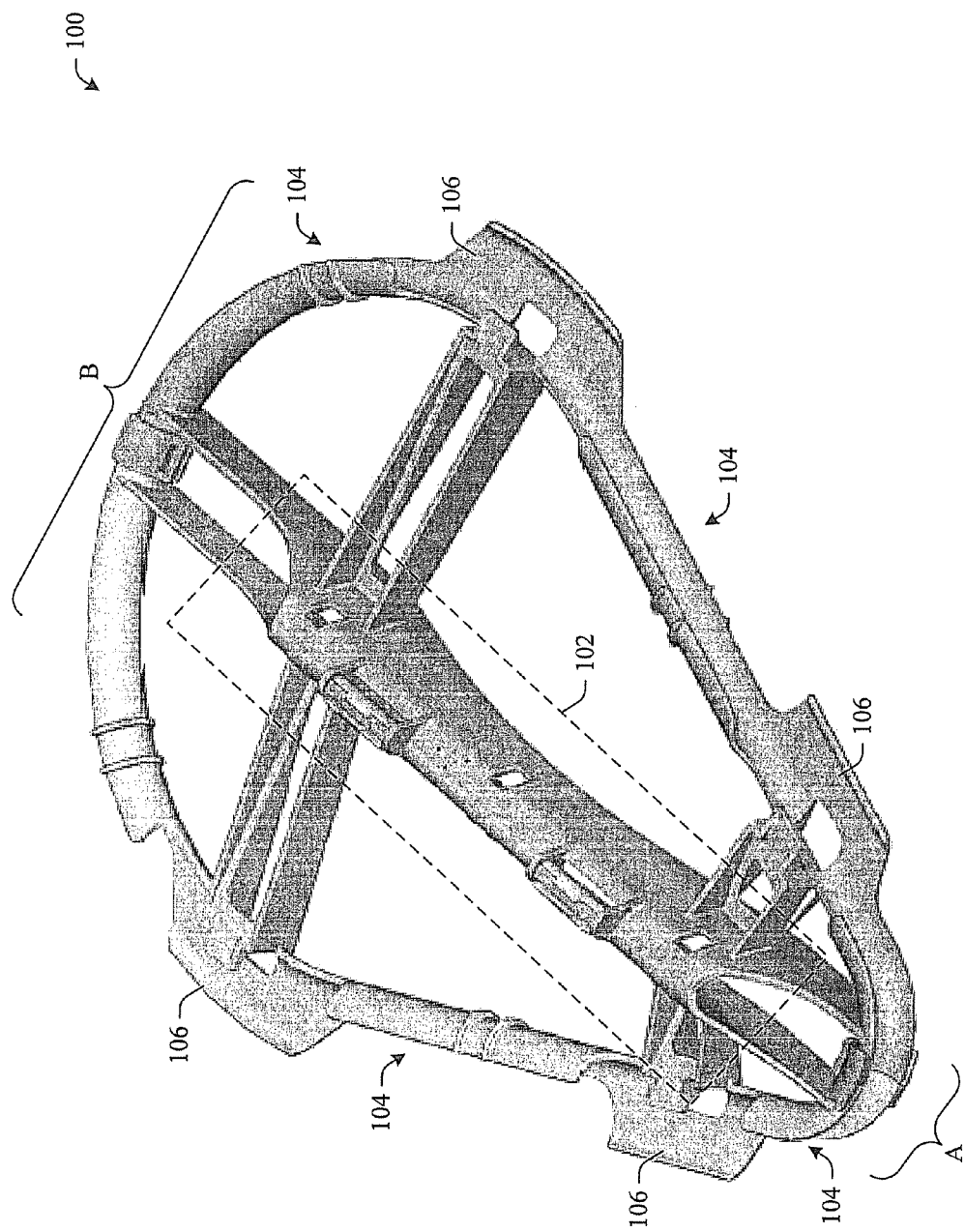
FIG. 1 illustrates an example perspective view of a center-lock aerial slack (CLAS) cable storage bracket in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are discussed in order to facilitate describing the innovation.

As described supra, the subject 'center-lock' aerial slack cable bracket (CLAS) can enhance installation, shipment and storage related to slack cable brackets generally. More particularly, in one aspect, a hinged two-piece design that is disclosed herein can reduce a need for specialized or common tools and/or hardware when installing the subject slack cable bracket. This enhancement related to installation efforts will be better understood upon a review of FIGS. 1 to 5 that follow. It is to be understood that, although embodiments described herein reference 'center lock,' it is to be understood that the halves or sections of the bracket need not 'lock' together. Rather, although locking together is to be included within the scope of this disclosure, the 'center lock' further refers to the functionality of locking upon a support cable upon installation.

Referring initially to the drawings, FIG. 1 illustrates a perspective view of the subject CLAS 100 in accordance with an embodiment of the specification. It is to be understood and appreciated that, although the slack cable brackets illustrated in FIGS. 1 to 5 are structured in accordance with the conventional 'teardrop' or 'snowshoe' shape, this shape is but just one embodiment of the innovation. Generally, the outer shape of the CLAS 100 can have a narrow end (A) that receives a cable and a wider arc (e.g., semicircle, bend) end (B) that provides a return for the stored cable length. it will be understood and appreciated that the radius of the arc can be designed in accordance with bend specifications of a particular cable application. In other words, those skilled in the art will understand that the CLAS of the subject innovation can be configured in most any shape so long as the minimum bend radius required by a specific cable (e.g., fiber-optic cable) is maintained, These alternative aspects are to be included within the scope of this disclosure and claims appended hereto.

One basic function of an aerial cable slack storage bracket is to support slack cable (e.g., excess lengths) in a cable span while maintaining the minimum bend radius requirements of the stored cable. Conventionally, these aerial slack cable slack storage brackets use standard tap brackets to attach to a cable under tension. As such, hardware kits (e.g., nuts, bolts) as well as tools are required for installation. In addition to making installation more difficult, these conventional 'kit' type systems increase the possibility of losing parts prior to installation, making the unit as a whole useless.

Contrary to conventional aerial slack cable slack storage brackets, the CLAS disclosed herein does not require hardware kits or tools for installation. Moreover, the unique design (e.g., mating or hinged two-piece frame) can make installation much quicker and easier than conventional units. As such, time and expense of installation can be reduced.

In addition to lowering time and cost of installation, the CLAS 100 illustrated in FIG. 1 can eliminate (or alleviate) need for storage vaults. As described above, in one aspect of the CLAS, the frame is generally of the form of a 'teardrop' or 'snowshoe.' However, other shapes are contemplated that maintain integrity of the cable by ensuring the minimum bend radius of a specific cable. One particular feature of the CLAS 100 shown in FIG. 1 is a center-lock strap fastening means for attachment 102 (as well as closure). This center-lock strap fastening mechanism 102 can be used to suspend the CLAS 100 from a strength member under tension. Additional features, functions and benefits of the fastening mechanism 102 will be described in greater detail infra.

Essentially, the CLAS 100 as described herein can be constructed with a substantially U-shaped channeling means 104 for receiving and storing a planar loop of cable, such as fiber-optic cable). As illustrated in FIG. 1, the channeling means 104 can be orientated parallel to the strength member to which the CLAS 100 can be mounted. As will be understood, lengths of cable can be wound into the channeling means 104 thereby effecting storage of lengths (e.g., excess fiber-optic cabling lengths).

While many of the examples and embodiments described herein are directed to storage of fiber-optic cables, it is to be understood that the CLAS 100 can be manufactured and adapted to accommodate most any cable having an outer diameter larger (or smaller) than standard fiber-optic cabling. It is to be appreciated that the perimeter's shape (as well as channeling means 104) of the CLAS 100 can be revised to accommodate appropriate bend diameters and radiuses. Still further, expansion tabs 106 or other means can be employed to effect uses with cables larger diameters. The expansion means 106 can further enable multiple cables to wrap around a single bracket. It will be understood that this multiple cable functionality can be especially useful in certain butt splice storage configurations. While the expansion tabs 106 are shown in FIG. 1 and considered a part of the scope of this disclosure and claims appended hereto, it is to be understood that other aspects can be employed without these tabs 106 as appropriate. These alternative aspects are to be included within the scope of this disclosure and claims appended hereto.

Figure 2:
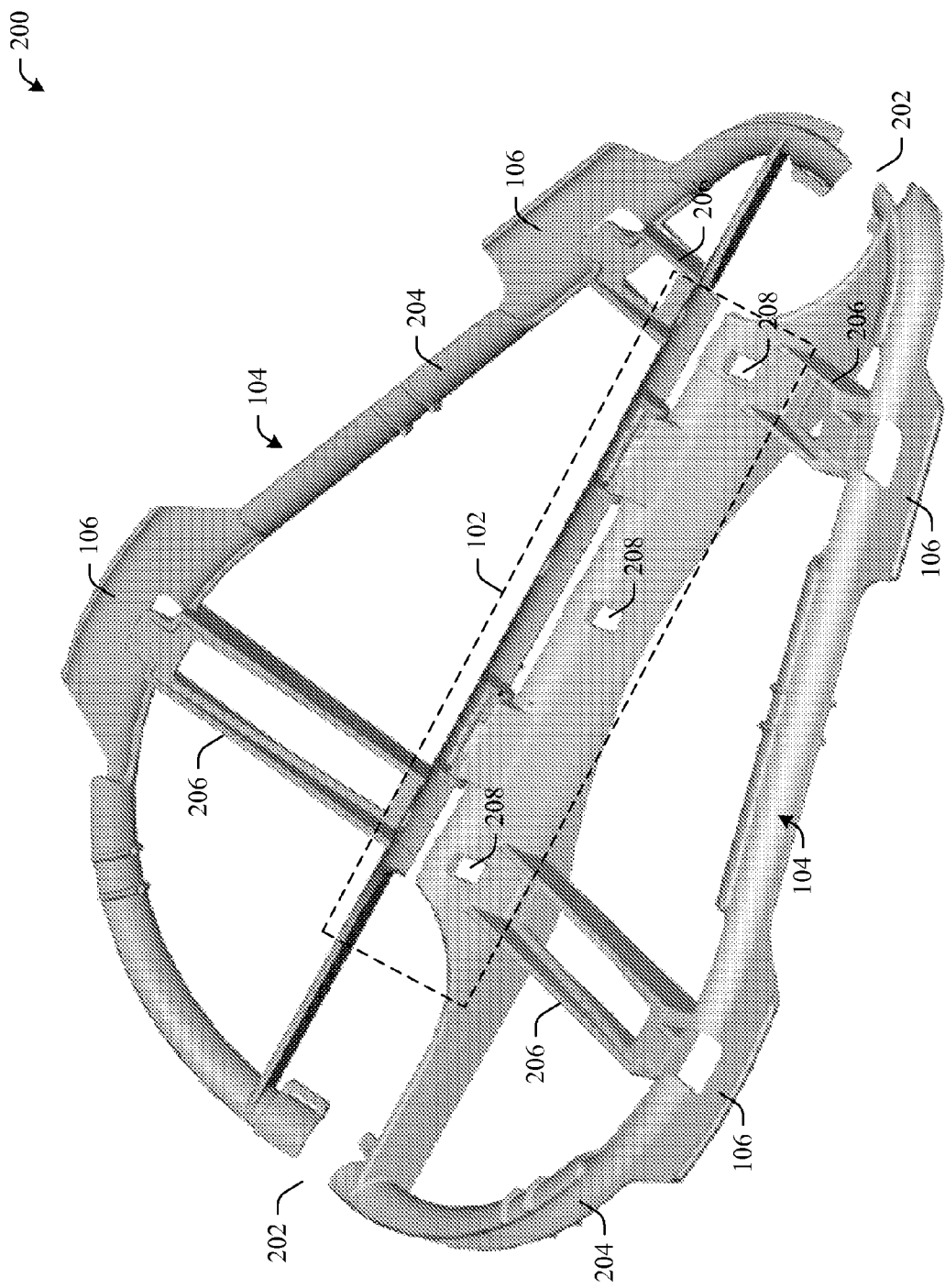
FIG. 2 illustrates perspective view that illustrates the hinging functionality of an example center CLAS bracket in accordance with an aspect of the innovation.

Turning now to FIG. 2, an alternative perspective view 200 of a CLAS is shown in accordance with an aspect of the innovation. As described above, in operation, the CLAS 200 can store cable (e.g., fiber-optic cable) in a span by winding cable within channeling means 104. Additionally, it is to be understood that the center-lock mechanisms 102 of CLAS 200 described herein can be employed to attach to most any supporting cable, for example All Dielectric Self Supporting Cable or Messenger Strand for lashed cable systems. Moreover, other aspects employ the CLAS 200 in connection with other types of members or cables under tension. These alternative aspects are to be included within the scope of this disclosure and claims appended hereto.

As shown in FIG. 2, the design of CLAS 200 includes two sections 204 (e.g., substantially symmetric halves or sub-frames) that are joined at opposite ends (at 202) when placed in position for installation. Essentially, the sub-frames 204 can be integrally joined at 202. Aspects can include most any joining or connection means known in the art, including but not limited to, force fit, pressure fit, locking clasps, slide cuffs or the like. In other words, the unit 200 can include a hingeable mechanism 102 that enables the sections 204 to effectively be folded (or separated) or lifted in generally a 'V-type' shape. This detachable or hinge-able functionality can facilitate ease of installation, shipment and/or storage. Moreover, because specific hardware kits and/or brackets need not be required for installation, shipment and storage are even more enhanced by the design of CLAS 200.

Referring now to a discussion of each of the sub-frames 204 of assembly 200. In aspects, each half 204 represents a substantially symmetric portion of the frame of assembly 200. It is to be understood that each section 204 represents substantially half of the assembly 200. For brevity, each half of the frame 200 will be referred to herein as sub-frame 204.

Each sub-frame can be constructed of a plastic, composite or other suitably rigid material capable of maintaining storage of cable within channeling means 104. For example, the sub-frame 204 can be constructed of molded plastic with suitable rigidity to maintain shape upon winding cable. Still further, it will be understood that the material can be treated to enhance longevity and operation in adverse climates, weather and environments. For example, ultra-violet protection (UV) can be applied to (or otherwise incorporated within) the material to enhance ability to withstand effects of environmental conditions.

As described supra, each sub-frame 204 can represent half (or substantially half) of the assembly 200. As shown in FIG. 2, each sub-frame 204 represents half of a teardrop or snow-shoe shaped assembly 200. Essentially, each sub-frame 204 includes an outer or perimeter portion having a channeling means 104 distributed therein. In aspects, the channeling means 104 can be molded as a part of the sub-frame 204 or alternatively, can be a separate channeling means 104 which is fixedly attached to establish the sub-frame 204. Further, the channel means 104 can be of any desired shape, for example, a U-shape that extends beyond 180 degrees.

Still further, tabs 106 (or expansion means) can be distributed along the channel means to accommodate larger diameters of the stored cable as well as expansion to more than one cable upon storage. It will be appreciated that these expansion tabs 106 can be distributed in an outwardly protruding fashion parallel to the plane of the bracket 200. As well, it will be understood that the tabs 106 can be of any desired size or shape consistent with a particular application. Additionally, the tabs can be separate from or molded within the sub-frame as desired. For example, the tabs 106 can be essentially externally applied clips (not shown) which can be added to an installation as needed to accommodate additional cables and/or larger outer diameter cables.

In operation, each sub-frame 204 of the bracket 200 is joined (e.g., hinged) at the central member (e.g., 102), which is most often symmetrically positioned around the centerline of the bracket 200, and locked around a support (not shown) using cable straps or other suitable durable connectors (e.g., plastic tie-wraps)—metal fasteners or hardware kits need not be used for installation. These cable straps are dual-purpose connectors in that they lock the central member (102) together while also securing the bracket (CLAS 200) to the cable under tension. Thus, it will be appreciated that this hinge-able feature conveniently suspends the bracket 200 during installation. In a similar manner, the slack cable secures to the teardrop-shaped channel area 104 of the bracket 200 while the bracket is coupled at 202. It is to be appreciated that, in aspects, the cable is secured at one end and not necessarily both ends.

Although a specific configuration of support structures or braces 206 is illustrated in FIG. 2, it will be understood that most any configuration of these structures 206 can be employed to effect the features, functions and benefits described herein. Similarly, while the central member 102 is shown and described to have a particular hinging means (e.g., 302 of FIG. 3), it is to be understood that most any suitable connection that enable the sub-frames 204 to interlock or otherwise pivot in relation to each other can be employed in alternative aspects. By way of example, alternative aspects employ individual sub-frames that fit around a cable under tension without pivoting and/or hinging. These alternative aspects are to be included within the scope of this disclosure and claims appended hereto.

During installation, in one aspect, the CLAS 200 is 'opened' as shown in FIG. 2 and positioned upon (e.g., over the top side of) a cable under tension. Once upon the cable under tension, the hinged mechanism 102 can be 'closed' around the cable. Next, cable straps can be installed into the apertures 208 to fixedly secure the CLAS 200 into position. It is to be understood that these slots or apertures 208 are located opposite the cable groove for the slack cable and provide for securing the bracket 200 to the cable (not shown) and to help lock the bracket 200 into position at the joined interface 202.

It is to be understood that the apertures 208 can be positioned in alternative locations without departing from the spirit and scope of the innovation. Additionally, additional or fewer apertures 208 can be used in alternative embodiments. The opening, e.g., height as well as the overall length of the apertures 208, can be designed to conform to specific cable diameters with regard to the cable under tension in addition to the size of cable tie employed to secure the bracket 200 upon the cable under tension. As well, it is to be appreciated that other aspects can employ other means of locking in position including, but not limited to, locking tabs, clasps, pins, pressure connectors, or the like.

Still further, although not illustrated in FIG. 2, additional apertures can be distributed upon the braces or structures 206 to effect stabilization upon the cable under tension. For example, these apertures can provide for additional supports to be affixed to the bracket 200 thereby reducing sway caused by wind or other undesirable environmental effects.

In an alternative aspect, a soft interlaced pad can be used at the strap and cable interface (102) to protect the cable under tension. As well, this pad can be used to increase the diameter of relatively small cables for compatible interface. However, it is to be understood that this pad is not necessarily a requirement provided that the strap fastening method or material is compatible with direct contact to the cable. This feature enhances the ability to offer easier attachment and/or protection, e.g., minimize and/or eliminate cable damage, when installing the CLAS 200. As described above and as shown in FIG. 9, the bracket (200) can be shipped disassembled to reduce overall size as well as shipping costs (e.g., smaller shipping containers). Similarly, inventory space can be decreased by storing the units 200 in a disassembled fashion. Still further, the joined (two-piece) system and cable straps reduce installation time to a fraction of other conventional hardware-based fastener systems.

Figure 3:
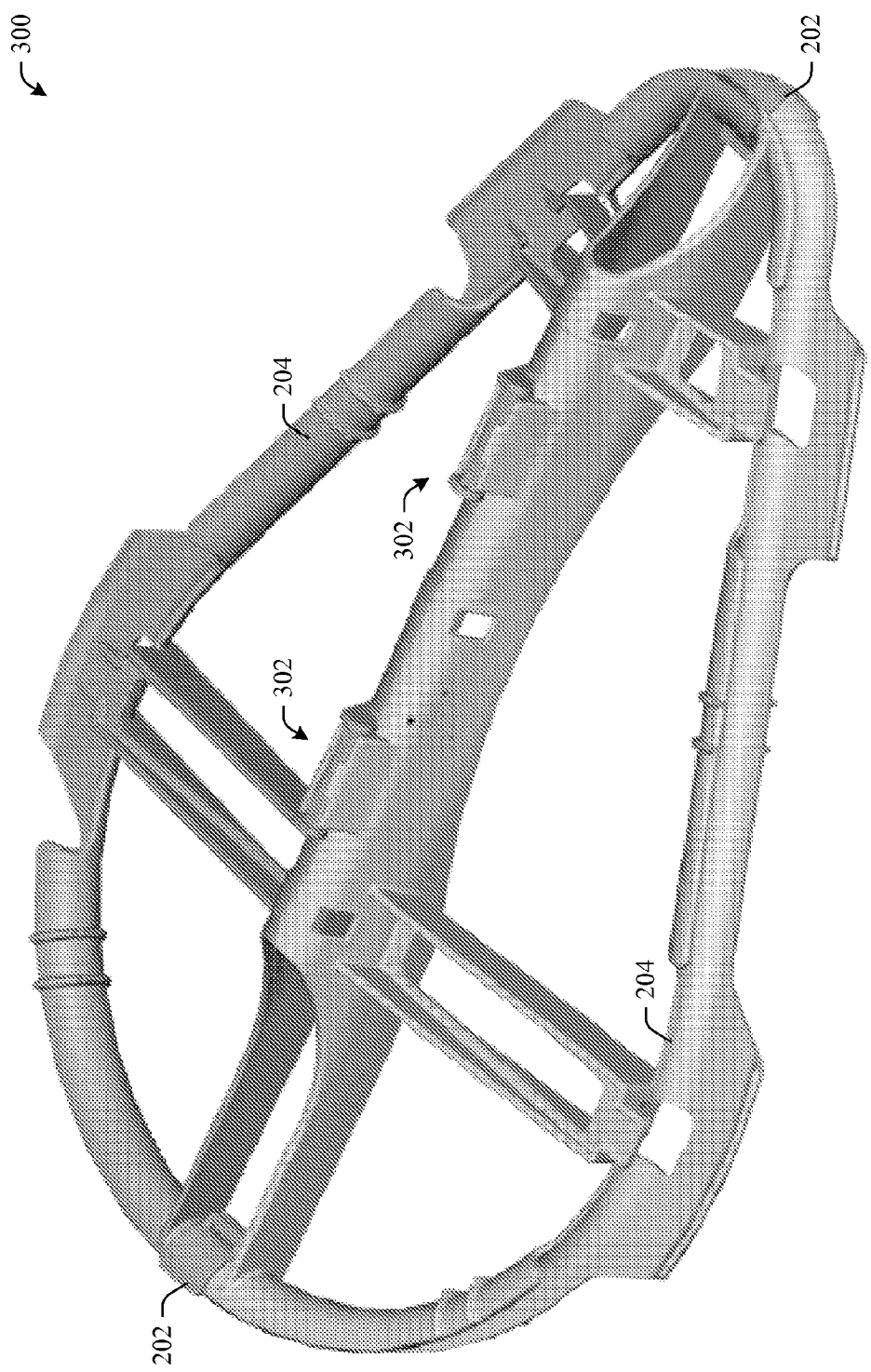
FIG. 3 illustrates an example perspective view of a CLAS bracket in accordance with an aspect of the innovation.

FIG. 3 illustrates yet another perspective view of an assembled CLAS 300 in accordance with an embodiment of the innovation. For illustration purposes, each sub-frame (204 of FIG. 2) of the CLAS 300 is shown in a different color. In particular a first sub-frame is illustrated in black while a second sub-frame is illustrated shaded in grey. This CLAS 300 is shown in the hinged-closed position as it would be when installed upon a cable under tension.

As can be seen in FIG. 3 and discussed with reference to FIG. 2, each end of the sub-frames 204 can be joined or connected at 202 and/or at hinging means 302. In one aspect, the ends can have slightly different diameters such that one of the ends overlays the other to effect a connection. Other aspects can employ other conceivable means of connecting the ends of the sub-frames 204 in order to construct a continuous outer channeled radius by which cable can be stored.

Figure 4:
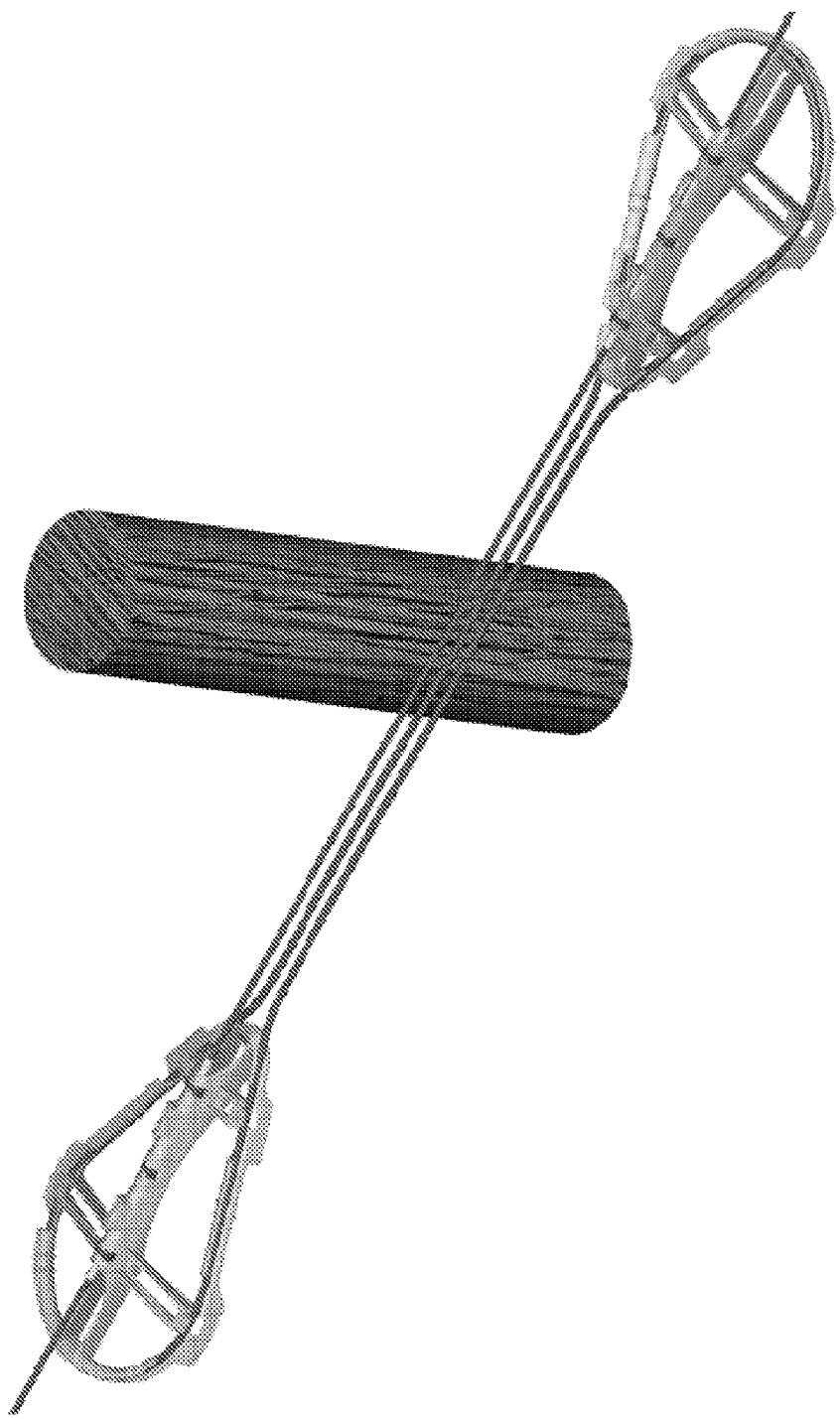
FIG. 4 illustrates an example installation that includes two CLAS brackets in accordance with an aspect of the innovation.
Figure 5:
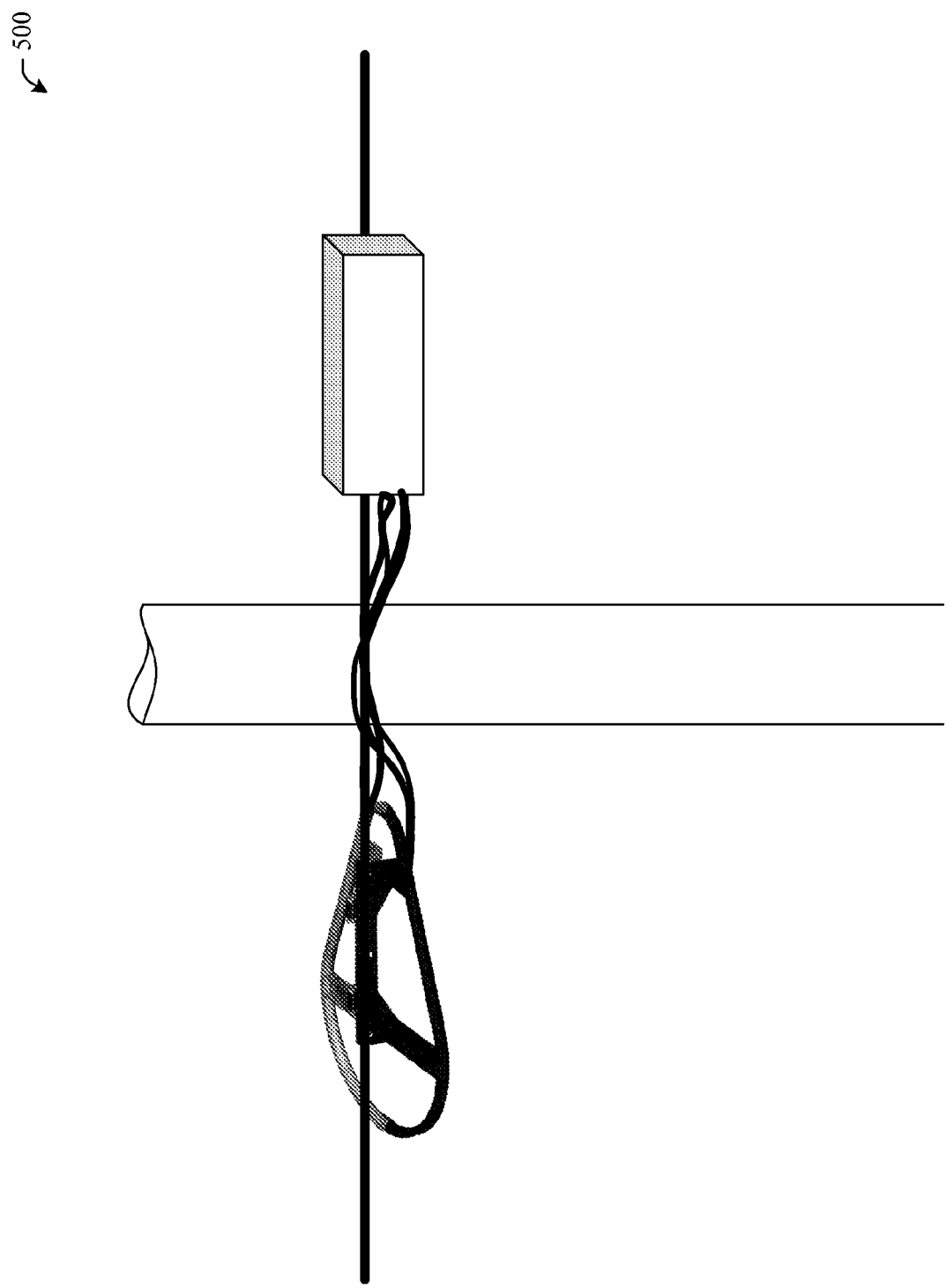
FIG. 5 illustrates an example installation that employs a CLAS bracket in accordance with an aspect of the innovation.

Referring now to FIGS. 4 and 5, example installations of the subject CLAS (e.g., 100, 200, 300) in accordance with the innovation are shown. In particular, FIG. 4 illustrates a reserve cable length strand storage application. Here, two CLAS units are employed to store excess cable lengths. In particular, FIG. 4 illustrates an arrangement 400 of storing excess cable lengths on a support strand in an aerial application. FIG. 5 illustrates a butt splice application 500 where excess lengths can be conveniently stored in-line with regard to butt applications. It will be understood that FIGS. 4 and 5 are two example arrangements of how the CLAS of the subject innovation can be employed to store excess cable lengths.

As shown in FIGS. 4 and 5, an excess length of cable (e.g., fiber-optic cable) can be stored by looping the cable around an outer periphery of the bracket of the subject specification, for example, within channel means 104. Further, as shown, the bracket can be suspended upon a cable under tension as described herein. More particularly, the sub-frames can be pivotably connected (e.g., via hinging means 302 of FIG. 3) and positioned upon the cable under tension. Upon encapsulating the cable under tension and therefore establishing a generally uniform plane between the sub-frames, the bracket assembly can easily be affixed using zip-ties or other suitable connecting means.

In operation, the generally U-shaped channel means faces outwardly from the bracket and can be used to accept (and store) cable lengths. It will be understood that the channel can be configured to conform to particular applications. In other words, if desired, the diameter of the channel can be larger to accommodate cables of larger diameter, multiple cables or multiple wraps as desired or appropriate. As well, the arc, bend or semi-circle shape of the channel can be configured in accordance with a specified bend radius of a cable for storage thereby, alleviating any damage to the stored cable.

Additionally, as described supra, the sub-frames of the bracket can be constructed of plastic, polymer or other suitably rigid synthetic material. For example, the frame(s) can be injected molded of plastic. There are at least a few benefits of constructing the bracket of molded plastic. These benefits include, but are not limited to, ease of manufacture, lower shipping costs (less weight), non-electrically conductive material, ease of installation (less weight), low cost of manufacture, etc.

Figure 6:
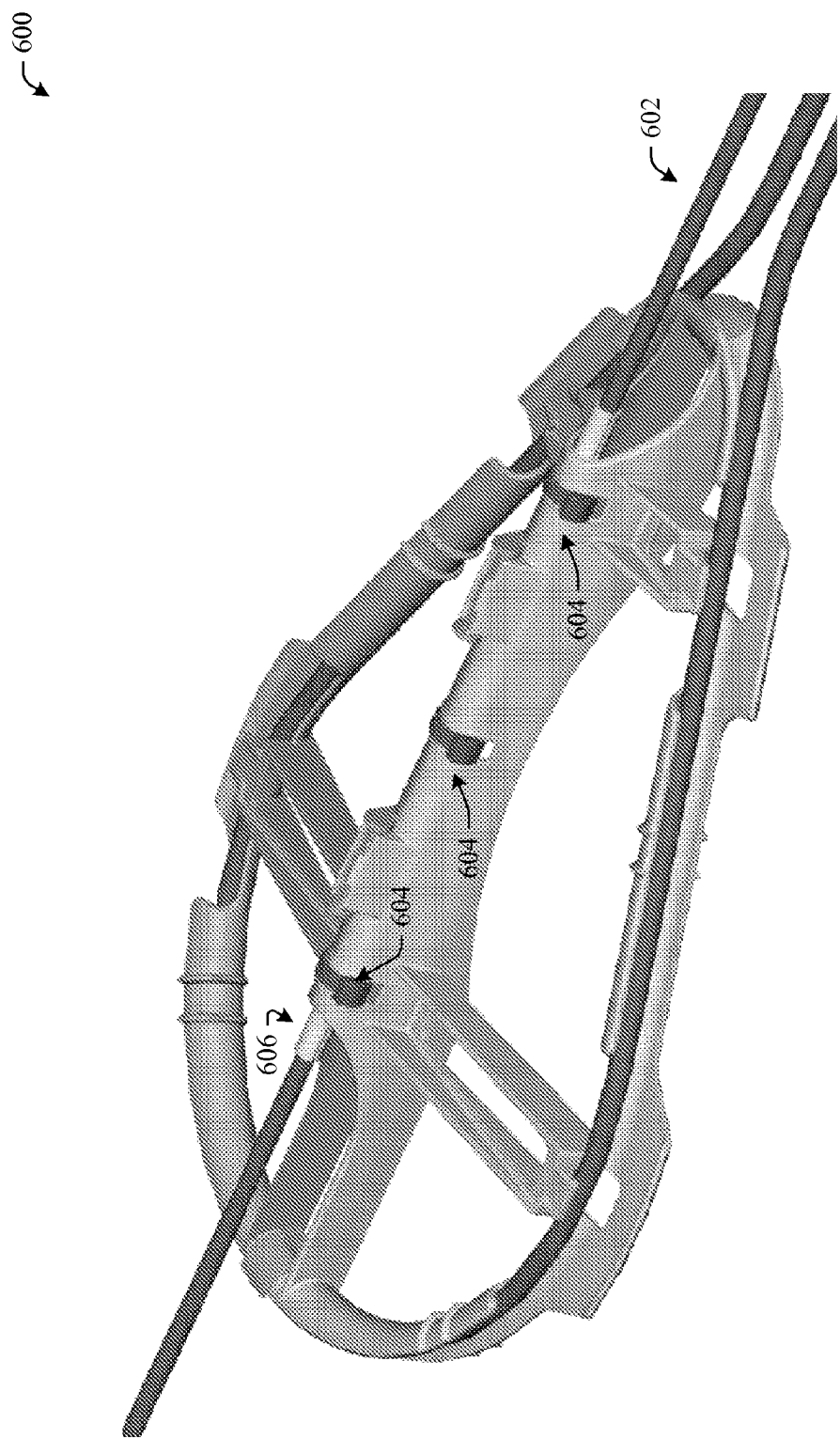
FIG. 6 illustrates an alternative view of an example CLAS bracket installed upon a strength member.

Referring now to FIG. 6, an example installation 600 of a slack cable storage bracket upon a cable under tension 602 is shown. As illustrated, the apparatus can be installed upon a cable under tension 602 using tie wraps, zip ties, or other suitable straps 604. Additionally, a pad or covering 606 can be applied to the cable under tension. As described above, this pad 606 can be used to protect the cable under tension and/or to increase the diameter of the cable under tension 602 which, as will be appreciated, aids in installation as well as support upon installation. In one aspect, the pad 606 can be a tube manufactured of 'elastomer' or other thermoplastic or material capable of retaining its properties in extreme environmental conditions (e.g., extreme cold).

Figure 7:
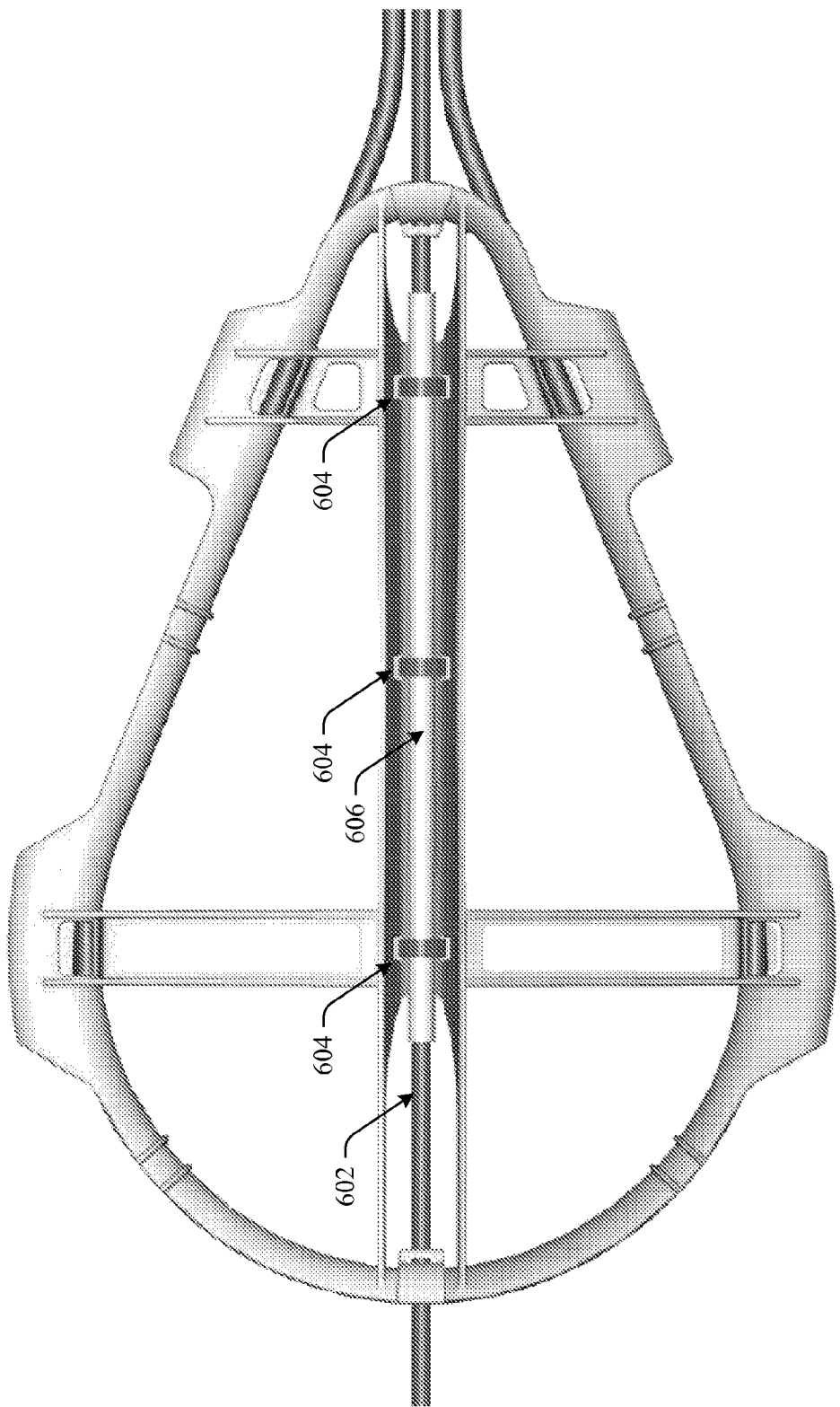
FIG. 7 illustrates an underside close-up view of the strap and pad of an example CLAS bracket.

FIG. 7 illustrates a bottom view 700 of the installation of FIG. 6. This illustration is provided to add perspective to the installation of FIG. 6. Although the installation of FIG. 7 employs pad 606, it is to be understood that alternative aspects exist that do not employ this optional pad 606. Still further, although the installations of FIG. 6 and 7 employ three evenly spaced straps 604, it is to be understood that more or less straps 604 can be employed as desired or in accordance with specific applications. Still further, alternative configurations and spacing of the straps 604 can be employed in alternative aspects. These alternative embodiments are to be included within the scope of this disclosure and claims appended hereto.

Figure 8:
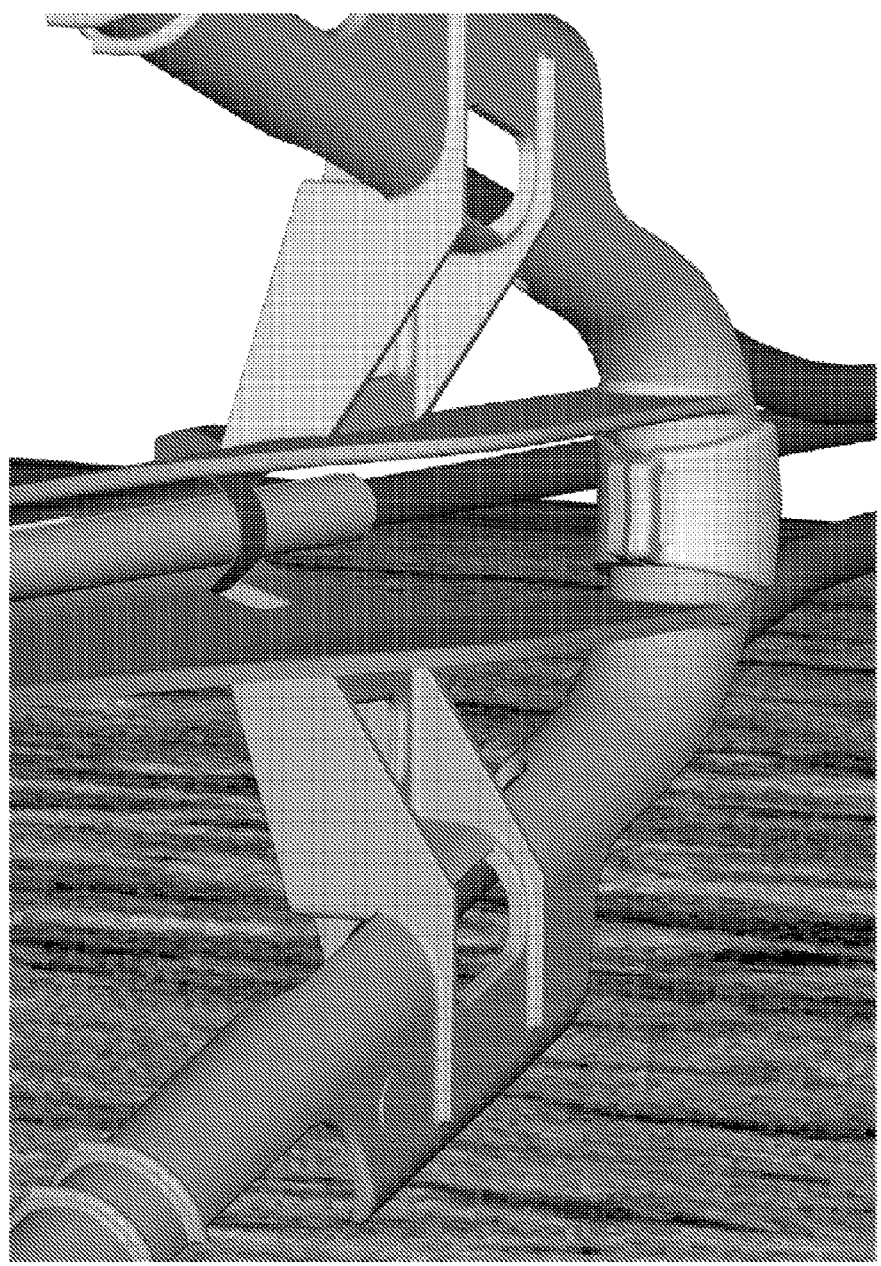
FIG. 8 illustrates an alternative view of an example CLAS bracket installation in accordance with an aspect.

FIG. 8 depicts yet another alternative view 800 of an example installation in accordance with the innovation. As shown, the installation 800 depicts how the cable under tension (or strength member) is positioned within the fastening mechanism (e.g., 102 of FIG. 1). Furthermore, this figure illustrates that the cable under tension, upon installation, is positioned above the frame of the bracket which includes the channel. Still further, as shown, the sub-frames of this example are fixedly connected at the centerline of the frame.

Figure 9:
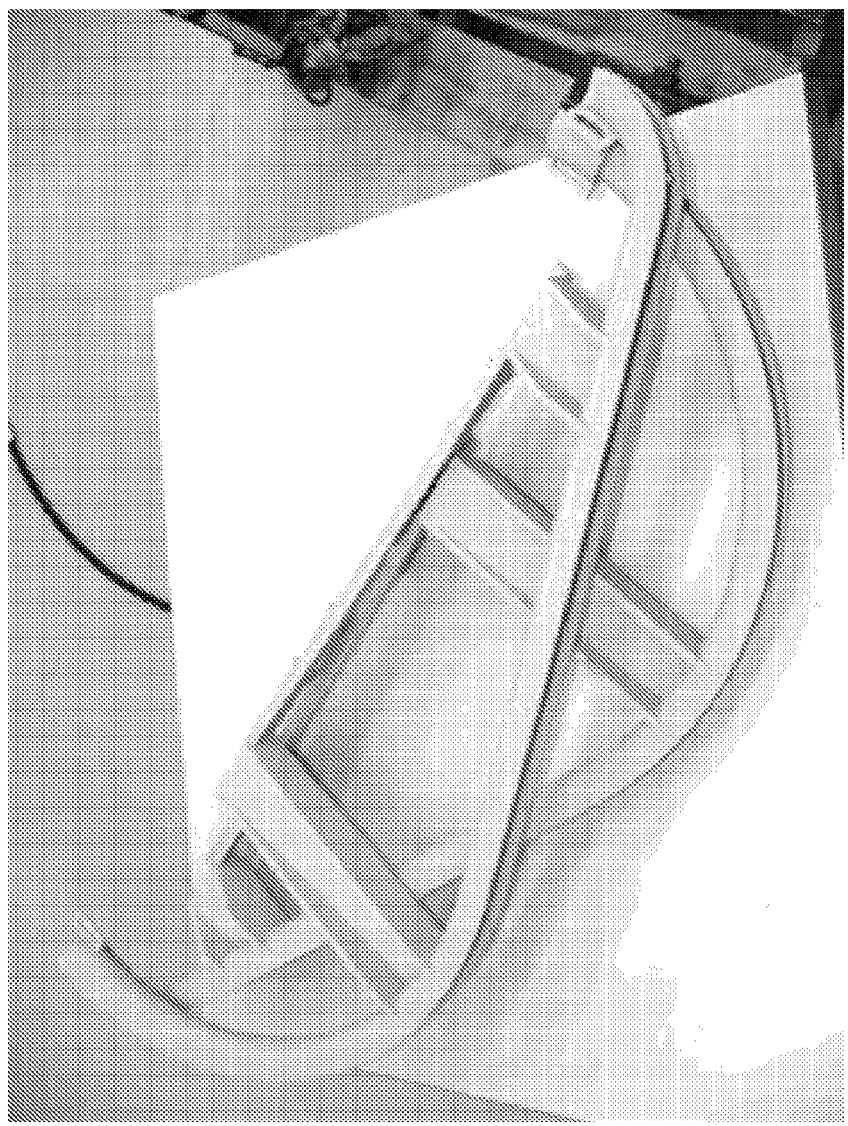
FIG. 9 illustrates an example CLAS bracket that is disassembled in accordance with an aspect of the innovation.

As described supra, FIG. 9 is an example illustration 900 of a disassembled bracket in accordance with an aspect. It is to be understood that this feature can lower costs of shipping as well as inventory of the apparatus. More particularly, the unit can be shipped in a smaller container thereby lowering shipping expense. Similarly, the compact size of the disassembled unit can lower inventory expense and enhance storage space.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A center-lock aerial slack (CLAS) cable storage bracket, comprising:
   means for pivotably connecting a first portion to a second portion of a bracket frame, wherein the means for pivotably connection is a hinging means; and
   means for positioning the first portion and the second portion in a substantially horizontal parallel plane upon a cable under tension, wherein the frame includes a channel that stores a length of a cable.

2. The CLAS bracket of claim 1, further comprising means for securing the frame to the cable under tension.

3. The CLAS bracket of claim 2, the means for securing is a cable strap.

4. The CLAS bracket of claim 1, further comprising means for stabilizing the frame with respect to environmental conditions.

5. The CLAS bracket of claim 1, further comprising a plurality of tabs distributed upon the channel, wherein the plurality of tabs provide support for multiple cables.

6. The CLAS bracket of claim 1, wherein the channel includes a narrow end and a wider arc end, wherein the wider arc end corresponds with a defined bend radius of the length of the cable.

7. A method for installing an aerial slack cable storage bracket, comprising:
   hinging a center-lock storage bracket into an open position, wherein the center-lock bracket includes a hinging means that pivotably connects a first frame portion to a second frame portion and a channel capable of storing a length of cable;

positioning the center-lock storage bracket upon a portion of a cable under tension; and hinging the first portion and the second portion of the storage bracket into a closed position, wherein the storage bracket in the closed position encloses the portion of the cable under tension and has a substantially parallel plane with the cable under tension.

8. The method of claim 7, further comprising employing a cable strap to secure the center-lock storage bracket in the closed position.

9. The method of claim 7, wherein the channel includes an arc that corresponds to a minimum bend radius of the length of cable.

10. The method of claim 7, further comprising connecting a first sub-frame to a second sub-frame, wherein the connected sub-frames comprise the center-lock storage bracket.

11. The method of claim 7, further comprising stabilizing the storage bracket from environmental effects.

12. The method of claim 7, further comprising applying a cover upon a portion of the cable under tension, wherein the cover increases an effective outer diameter of the portion of the cable under tension.

13. The method for claim 7, further comprising employing a tie wrap to secure the center-lock storage bracket upon the portion of the cable under tension.

14. An apparatus that stores cable, comprising:
a first sub-frame that includes a molded channel and a center-lock portion;
a second sub-frame that includes a molded channel and a center-lock portion that mates to the center-lock portion of the first sub-frame; and
a hinging mechanism that pivotably connects the first sub-frame and the second sub-frame to form a contiguous channel, wherein the contiguous channel is substantially U-shaped and capable of storing cable in a wrapped fashion.

15. The apparatus of claim 14, wherein the contiguous channel includes an arc that corresponds with a minimum bend radius of the cable.

16. The apparatus of claim 14, further comprising a plurality of apertures distributed along the connection mechanism, wherein the apertures facilitate employment of a plurality of straps to secure the contiguous frame to a tension component.

17. The apparatus of claim 14, further comprising two locking components that operatively secure corresponding ends of the first and second sub-frames.

18. The apparatus of claim 14, wherein the contiguous channel is a molded plastic channel.

\* \* \* \* \*